United States Patent [19]

Fierkens

[11] Patent Number: 5,478,226

[45] Date of Patent: Dec. 26, 1995

[54] AUTOMATIC PLUNGER APPARATUS FOR USE IN FORMING ENCAPSULATED SEMICONDUCTOR CHIPS

[76] Inventor: Richard H. J. Fierkens, Keurbeck 15, 6914 Ae Herwen, Netherlands

[21] Appl. No.: 230,304

[22] Filed: Apr. 20, 1994

[51] Int. Cl.$^6$ ............................ B29C 45/02; B29C 45/18
[52] U.S. Cl. ...................... 425/129.1; 425/136; 425/145; 425/151; 425/544; 264/272.17
[58] Field of Search ................................ 425/116, 129.1, 425/145, 151, 136, 544, 588, DIG. 228, 469; 264/272.17

[56] References Cited

U.S. PATENT DOCUMENTS

| | | | |
|---|---|---|---|
| 4,386,898 | 6/1983 | Sera | 425/544 |
| 4,511,317 | 4/1985 | Bandsh | 425/116 |
| 4,632,653 | 12/1986 | Plocher | 425/129.1 |
| 4,723,899 | 2/1988 | Osada | 425/116 |
| 4,900,485 | 2/1990 | Murakami | 264/272.17 |
| 5,158,780 | 10/1992 | Schraven et al. | 264/272.17 |

FOREIGN PATENT DOCUMENTS 2-266907  10/1990  Japan ............................ 264/272.17

Primary Examiner—Khanh P. Nguyen
Attorney, Agent, or Firm—Harry M. Weiss; Jeffrey D. Moy; Harry M. Weiss & Associates

[57] ABSTRACT

An automatic plunger apparatus is disclosed for compressing molten plastic into a cavity for forming an encapsulated semiconductor device. A compressing device drives a plunger member in order to compress and direct molten plastic to flow in a forward direction into the cavity. An overload compensator is coupled to the plunger member for permitting the plunger member to withdraw in a reverse direction when the plunger member is prevented from compressing and directing the molten plastic to flow in the forward direction into the cavity. The overload compensator includes a first member retained within a second member for transferring the force from the compressing device into motion of the plunger member. When the plunger member is prevented from compressing and directing the molten plastic to flow in the forward direction into the cavity, the first member pops out of the second member in order to permit the plunger member to withdraw in a reverse direction, thereby protecting the plunger, the cavity, and the semiconductor device.

10 Claims, 2 Drawing Sheets

AUTOMATIC PLUNGER APPARATUS FOR USE IN FORMING ENCAPSULATED SEMICONDUCTOR CHIPS

BACKGROUND OF THE INVENTION

1. Field of the Invention

This invention relates generally to apparatus for forming encapsulated semiconductor chips and, more specifically, to an automatic plunger apparatus for compressing molten plastic into a cavity for forming an encapsulated semiconductor device.

2. Description of the Related Art

Automatic plunger apparatus for use in encapsulating semiconductor devices are well known to those skilled in the art. In general, semiconductor chips coupled to a leadframe are contained within a cavity. Plastic pellets are heated in order to form a molten plastic fluid which is compressed by the plunger to fill the cavity with the molten plastic fluid. Occasionally, the force exerted by this compression is substantial enough to damage the plunger, the semiconductor chip, and/or other components.

Accordingly, automatic plunger apparatus are typically designed to have over-pressure protection. For example, in the prior art automatic plunger apparatus, the pressure in the cavity is sensed electronically in order to create an electrical signal corresponding to the measured pressure inside the cavity. This signal is compared using an electronic comparing circuit having a signal representation corresponding to the maximum pressure permitted within the cavity. If the signal corresponding to the measured pressure exceeds the signal corresponding to the maximum pressure permitted within the cavity, then the comparing circuit generates control signals to stop compressing the molten plastic fluid. This prior art approach has several disadvantages. Specifically, components within the electronic control system sometimes fail, thereby causing a temporary loss of over-pressure protection. Additionally, the prior art approach to provide over-pressure protection only checks for the pressure within the cavity. It is possible that the plunger could be mechanically jammed such that there is no compression of the molten fluid, and therefore, no indication of a problem. Nonetheless, in this case, the plunger can be severely damaged.

Therefore, there existed a need to create a more reliable automatic plunger apparatus that disengages the applied force to the plunger when the plunger is prevented from compressing the molten plastic into the cavity.

SUMMARY OF THE INVENTION

In accordance with one embodiment of this invention, it is an object of this invention to provide an automatic plunger apparatus for compressing molten plastic into a cavity for forming an encapsulated semiconductor device.

BRIEF DESCRIPTION OF THE PREFERRED EMBODIMENTS

In accordance with one embodiment of this invention, an automatic plunger apparatus for compressing molten plastic into a cavity for forming an encapsulated semiconductor device is disclosed comprising, in combination, compressing means including a plunger member for compressing and directing the molten plastic to flow in a forward direction into the cavity, and overload compensation means or overload compensator coupled to the plunger member for permitting the plunger member to withdraw in a reverse direction when the plunger member is prevented from compressing and directing the molten plastic to flow in the forward direction into the cavity. The overload compensation means comprises a first member coupled to a second member, and the first and second members have a first configuration for permitting the plunger member to compress and direct the molten plastic to flow in the forward direction into the cavity. The first and second members also have a second configuration for permitting the plunger member to withdraw in the reverse direction when the plunger member is prevented from compressing and directing the molten plastic to flow in the forward direction into the cavity. In the first configuration, the first member is retained in a slot of the second member such that the first member is in-line with the second member, and in the second configuration, the first member is dislodged from the slot in response to the plunger member being prevented from compressing and directing the molten plastic to flow in the forward direction into the cavity. The plunger member includes a plunger at a distal end thereof for compressing and directing the molten plastic to flow in the forward direction into the cavity, and, in addition, the plunger member includes a notch in a proximate end thereof for engagement with a portion of the overload compensation means. The first member has a protrusion for engagement with the notch when the first member and the second member are in the first configuration. The compressing means includes means coupled to the overload compensation means for moving the overload compensation means, and this movement of the overload compensation means causes the protrusion to move the plunger member. The overload compensation means also includes a spring loaded shaft means for applying a retaining force against an end of the first member for retaining the first member in the slot. This retaining force is adjustable. When the plunger member is prevented from compressing and directing the molten plastic to flow in the forward direction into the cavity, a resistive force is applied from the plunger member against the protrusion that exceeds the retaining force such that the first member is dislodged from the slot and the protrusion is dislodged from the notch, thereby permitting the plunger member to withdraw in the reverse direction. The means for moving the overload compensation means is a pneumatic press.

The foregoing and other objects, features, and advantages of the invention will be apparent from the following, more particular, description of the preferred embodiments of the invention, as illustrated in the accompanying drawings.

DESCRIPTION OF THE PREFERRED EMBODIMENTS

Figures 1, 2:
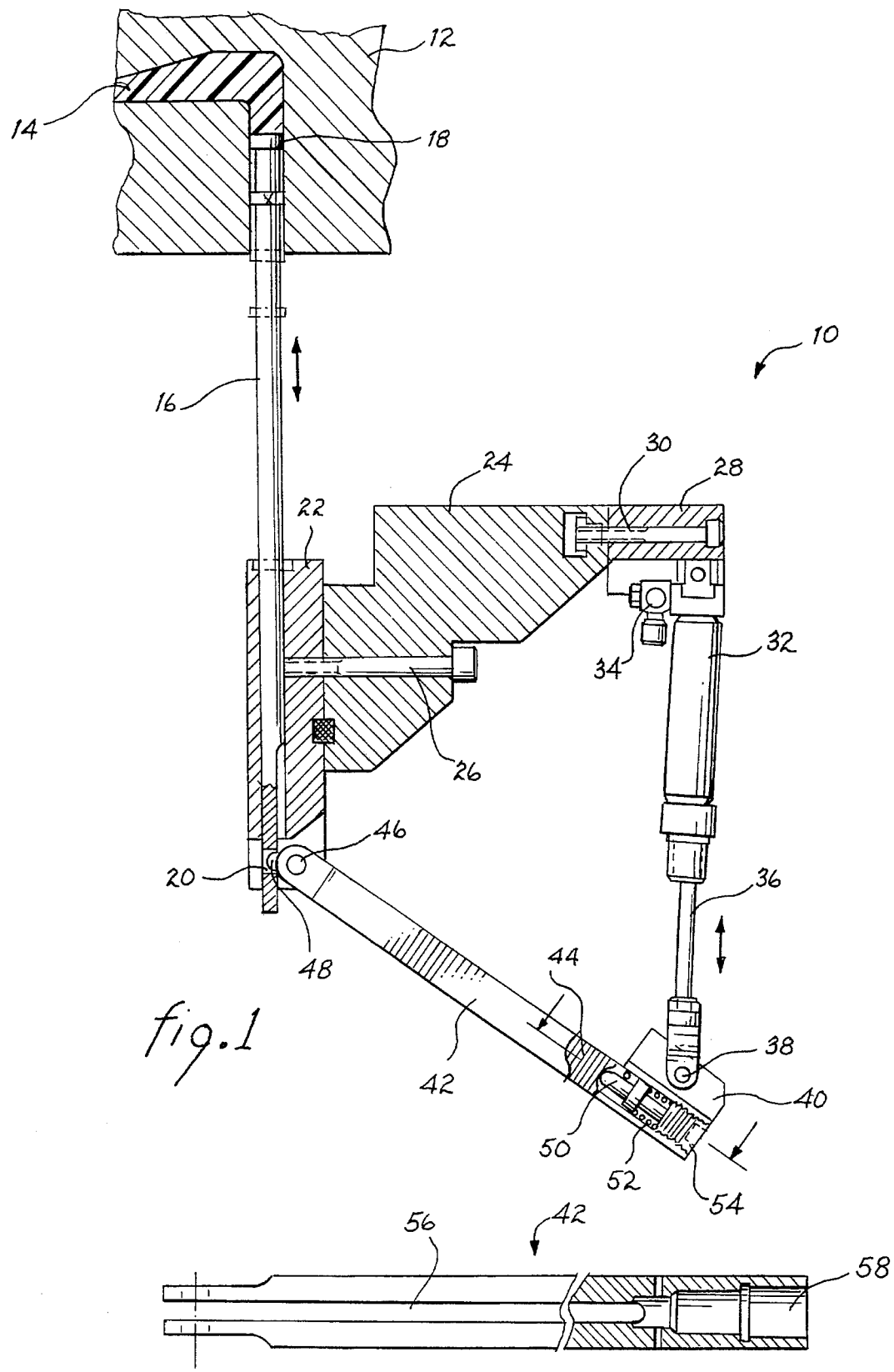
FIG. 1 is a side elevational view with portions shown in cross section of the automatic plunger apparatus. Note that the first member and the second member are in the first configuration.
FIG. 2 is a top view of the second member of the automatic plunger apparatus.

Referring to FIG. 1, the automatic plunger apparatus, or more simply, the apparatus, is shown and is generally designated by reference number 10. A mold 12 has a conduit 14 with molten plastic being compressed therein in order to encapsulate a semiconductor chip (not shown). A plunger member 16 has a plunger 18 at a distal end thereof for compressing the molten plastic. Additionally, a notch 20 is formed near a proximate end of the plunger member 16. The plunger member 16 has a plunger guide 22 which is coupled to a block 24 with connector 26. The block 24 is also coupled to a block 28 with the connector 30. Attached to block 28 is a pneumatic press 32 having a vent relief valve 34. Pneumatic presses 32 are well known in the art. Pneumatic pressure is used to drive the pneumatic press 32 which causes the shaft 36 to be moved, alternatively, up and down as indicated by the double headed arrow next to the shaft 36.

The shaft 36 is coupled by connector 38 to an overload compensator 40. The overload compensator 40 includes a first member 44 located within a slot 56 (see FIG. 2) of a second member 42. Please note that the first member 44 and the second member 42 are in-line. This in-line configuration permits the motion of the shaft 36, up and down, to move the plunger member 16 down and up, respectively. The first member 44 is coupled to the second member 42 with a connector 46 which is coupled to the plunger guide 22. Also note that the first member 44 has a protrusion 48 which engages the notch 20. The overload compensator 40 also includes a retainer 50 which is forced against a groove 60 (see FIG. 4) in an end of the first member 44 by a compressed spring 52. Note that an adjustment nut 54 is provided to adjust the compression of the spring 52, and, therefore, the force of the retainer 50 against the groove 60.

Referring to FIG. 2, a top view of the second member 42 shows the slot 56 therein. Additionally, a cavity 58 is formed therein to permit insertion of the retainer 50, the spring 52, and the adjustment nut 54.

Figure 3:
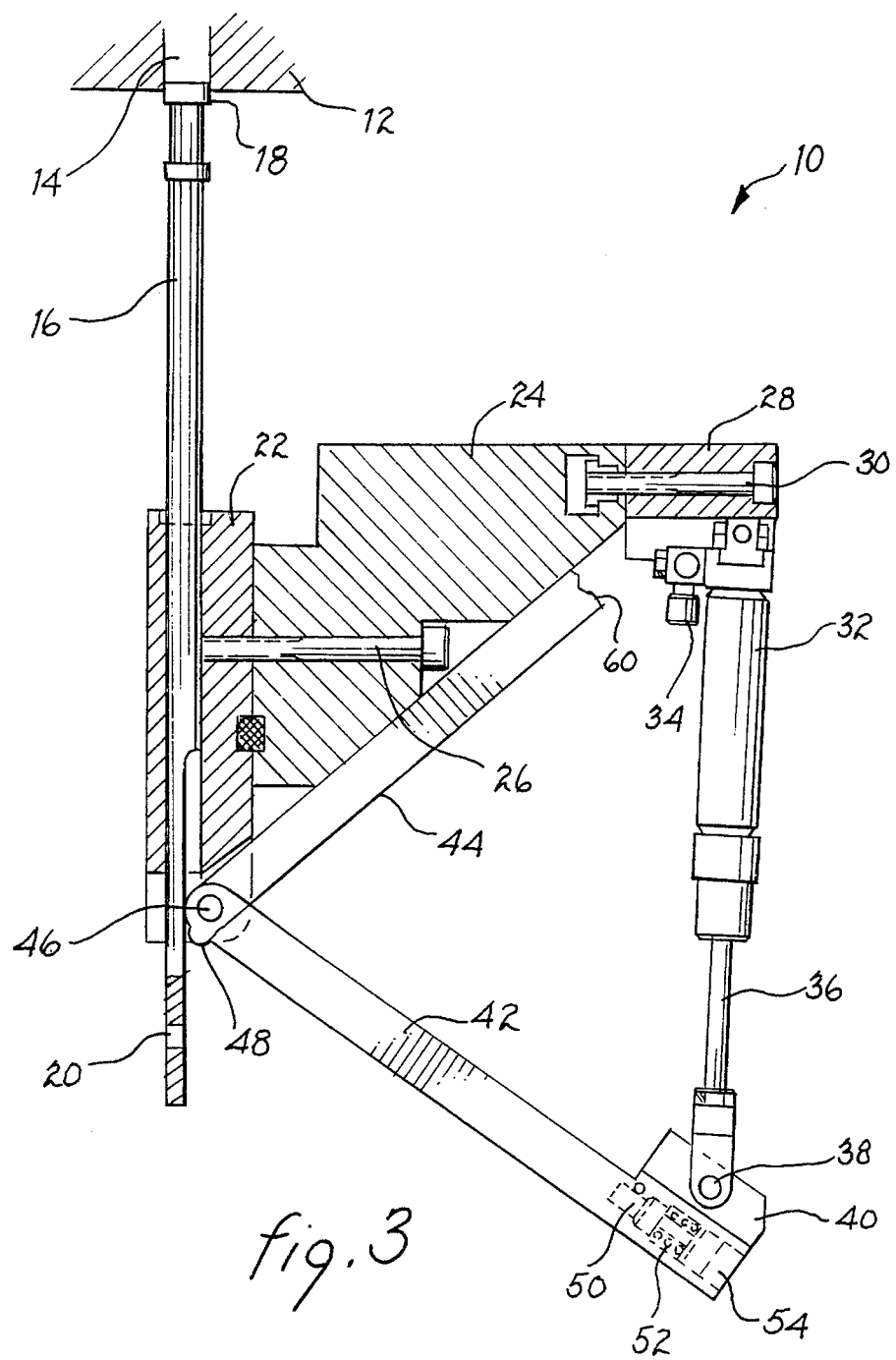
FIG. 3 is a side elevational view with portions shown in cross section of the automatic plunger apparatus. Note that the first member and the second member are in the second configuration.

Referring to FIG. 3, the description of the apparatus 10 is substantially similar to the description of the apparatus 10 of FIG. 1. The primary difference between the apparatus 10 as shown in FIG. 1, as compared to FIG. 3, is that the first 44 and second 42 members are in-line in FIG. 1. This in-line configuration permits the motion of the shaft 36, up and down, to move the plunger member 16 down and up, respectively. In contrast, in FIG. 3, the first 44 and second 42 members are not in-line, and clearly, the first member 44 is no longer within the slot 56 of the second member 42. Also, note that in FIG. 3, the protrusion 48 is no longer engaged with the notch 20, as opposed to the state of the apparatus 10 as shown in FIG. 1.

Figure 4:
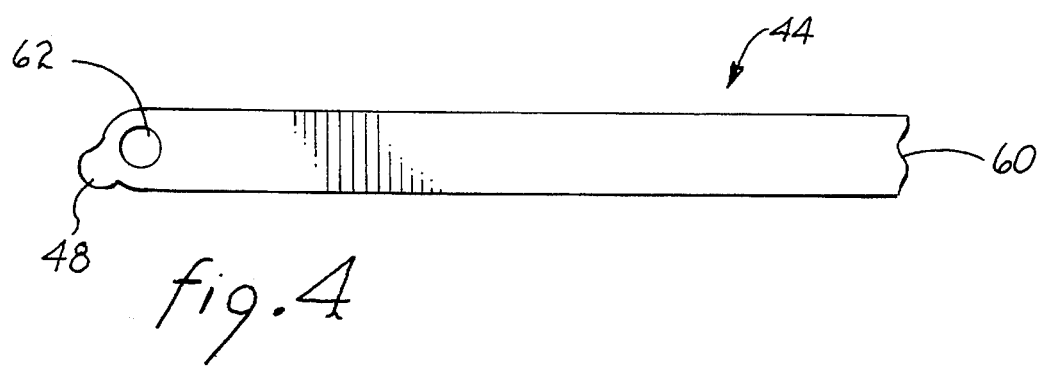
FIG. 4 is a side view of the first member of the automatic plunger apparatus.

Referring to FIG. 4, a more detailed view of the first member 44 shows the protrusion 48 and the groove 60. Also note that an aperture 62 is formed at an end of the first member 44 in order to permit the first member 44 to be coupled to the second member 42 with the connector 46.

OPERATION

Under normal operation of the apparatus 10, the cycling of the pneumatic press 32 causes the shaft 36 to move up and down. The motion of the shaft 36 is transferred through the overload compensator 40 to the plunger member 16 via the engagement of the protrusion 48 with the notch 20, and consequently, the plunger 18 moves down and up, respectively. The upward motion of the plunger 18 causes the compressing and directing of the molten plastic to flow in a forward direction into the cavity, thereby encapsulating a semiconductor chip. Subsequently, the plunger 18 moves down until another semiconductor chip is ready for encapsulation. When the first member 44 and the second member 42 are in a first in-line configuration, the plunger member 16 is permitted to compress and direct the molten plastic to flow in the forward direction into the cavity.

Under abnormal operating conditions of the apparatus 10, the first 44 and second 42 members have a second configuration for permitting the plunger member 16 to withdraw in a reverse direction when the plunger member 16 is prevented from compressing and directing the molten plastic to flow in the forward direction into the cavity. Such abnormal conditions might occur when the plunger member 16 is mechanically bound or when the conduit 14 is blocked. Under both of these conditions the plunger member 16 is prevented from compressing and directing the molten plastic to flow in the forward direction into the cavity. As a result, a resistive force is applied from the plunger member 16 downward against the protrusion 48 that exceeds the retaining force holding the first 44 and second 42 members in the in-line configuration. Note that the retaining force is provided by the retainer 50 compressed by the spring 52. Since the resistive force exceeds the retaining force, the first member 44 is dislodged from the slot 56 and the protrusion 48 is dislodged from the notch 20, thereby permitting the plunger member 16 to withdraw in the reverse direction. Note that by adjusting the nut 54, the retaining force can be adjusted.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. An automatic plunger apparatus for compressing molten plastic into a cavity for forming an encapsulated semiconductor device comprising, in combination:

compressing means including a single plunger member for compressing and directing said molten plastic to flow in a forward direction into said cavity; and overload compensation means coupled to said single plunger member and having a first configuration for moving said single plunger member in said forward direction to compress and to direct said molten plastic into said cavity and having a second configuration for permitting said single plunger member to withdraw in a reverse direction when said single plunger member is prevented from compressing and directing said molten plastic to flow in said forward direction into said cavity.

2. An automatic plunger apparatus for compressing molten plastic into a cavity for forming an encapsulated semiconductor device comprising, in combination:

compressing means including a plunger member for compressing and directing said molten plastic to flow in a forward direction into said cavity; and overload compensation means coupled to said plunger member for permitting said plunger member to withdraw in a reverse direction when said plunger member is prevented from compressing and directing said molten plastic to flow in said forward direction into said cavity;

said overload compensation means comprising a first member coupled to a second member, said first and said second members having a first configuration for permitting said plunger member to compress and direct said molten plastic to flow in said forward direction into said cavity, and said first and said second members having a second configuration for permitting said plunger member to withdraw in said reverse direction when said plunger member is prevented from compressing and directing said molten plastic to flow in said forward direction into said cavity.

3. The apparatus of claim 2 wherein said first configuration having said first member being retained in a slot of said second member such that said first member is in-line with said second member, and said second configuration having said first member dislodged from said slot in response to said plunger member being prevented from compressing and directing said molten plastic to flow in said forward direction into said cavity.

4. The apparatus of claim 3 wherein said plunger member includes a plunger at a distal end thereof for compressing and directing said molten plastic to flow in said forward direction into said cavity, said plunger member further including a notch in a proximate end thereof for engagement with a portion of said overload compensation means.

5. The apparatus of claim 4 wherein said first member having a protrusion for engagement with said notch when said first member and said second member are in said first configuration.

6. The apparatus of claim 5 wherein said compressing means includes means coupled to said overload compensation means for moving said overload compensation means, said moving of said overload compensation means causing said protrusion to move said plunger member.

7. The apparatus of claim 6 wherein said overload compensation means includes a spring loaded shaft means for applying a retaining force against an end of said first member for retaining said first member in said slot, said retaining force being adjustable.

8. The apparatus of claim 7 wherein when said plunger member is prevented from compressing and directing said molten plastic to flow in said forward direction into said cavity, a resistive force is applied from said plunger member against said protrusion that exceeds said retaining force such that said first member is dislodged from said slot and said protrusion is dislodged from said notch, thereby permitting said plunger member to withdraw in said reverse direction.

9. The apparatus of claim 6 wherein said means for moving said overload compensation means is a pneumatic press.

10. An automatic plunger apparatus for compressing molten plastic into a cavity for forming an encapsulated semiconductor device comprising, in combination:

compressing means including a plunger member for compressing and directing said molten plastic to flow in a forward direction into said cavity; and overload compensation means coupled to said plunger member for permitting said plunger member to withdraw in a reverse direction when said plunger member is prevented from compressing and directing said molten plastic to flow in said forward direction into said cavity;

said overload compensation means comprising a first member coupled to a second member, said first and said second members having a first configuration for permitting said plunger member to compress and direct said molten plastic to flow in said forward direction into said cavity, and said first and said second members having a second configuration for permitting said plunger member to withdraw in said reverse direction when said plunger member is prevented from compressing and directing said molten plastic to flow in said forward direction into said cavity;

said first configuration having said first member being retained in a slot of said second member such that said first member is in-line with said second member, and said second configuration having said first member dislodged from said slot in response to said plunger member being prevented from compressing and directing said molten plastic to flow in said forward direction into said cavity;

said plunger member including a plunger at a distal end thereof for compressing and directing said molten plastic to flow in said forward direction into said cavity, said plunger member further including a notch in a proximate end thereof for engagement with a portion of said overload compensation means;

said first member having a protrusion for engagement with said notch when said first member and said second member are in said first configuration;

said compressing means including means coupled to said overload compensation means for moving said overload compensation means, said moving of said overload compensation means causing said protrusion to move said plunger member;

said overload compensation means including a spring loaded shaft means for applying a retaining force against an end of said first member for retaining said first member in said slot, said retaining force being adjustable; and when said plunger member is prevented from compressing and directing said molten plastic to flow in said forward direction into said cavity, a resistive force is applied from said plunger member against said protrusion that exceeds said retaining force such that said first member is dislodged from said slot and said protrusion is dislodged from said notch, thereby permitting said plunger member to withdraw in said reverse direction.

* * * * *